Patented Nov. 7, 1950

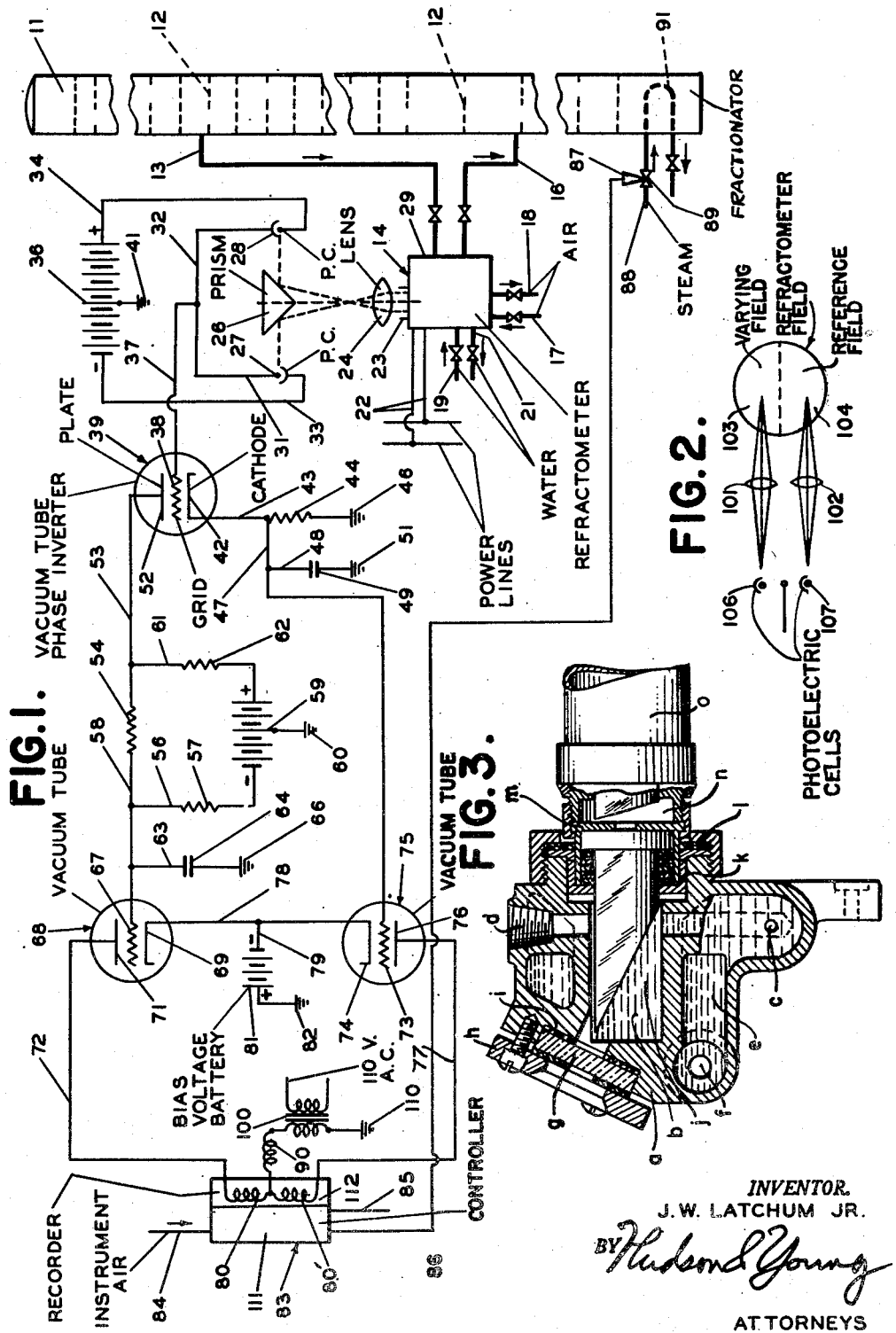

2,529,030

UNITED STATES PATENT OFFICE 2,529,030

DISTILLATION CONTROL BY REFRACTIVE INDEX

John W. Latchum, Jr., Bartlesville, Okla., assignor to Phillips Petroleum Company, a corporation of Delaware Application April 25, 1946, Serial No. 664,773

3 Claims. (Cl. 202—40)

This invention relates to a method and apparatus for process control. In one of its more specific aspects it relates to a method and apparatus for liquid process control based upon the index of refraction of liquids in process. In another and still more specific aspect the method and apparatus may be applied to the control of a fractionator column.

In the fractionation of mixed hydrocarbon stocks the distillation range of a given fraction removed from the fractionator bottom or overhead is an approximate function of the temperature and pressure of the oil within the fractionator at the point of withdrawal. Likewise, the boiling range of the contents of a given tray at a given pressure is more or less a function of the temperature on that tray. Thus by controlling a fractionator tray temperature and pressure, the boiling range of material withdrawn from that tray may be made to remain uniform. In like manner, the boiling range of the uncondensed vapors passing from the top of a fractionator operating at a given pressure is approximately proportional to their temperature at their point of exit from the tower. End point of this vaporous material is also proportional to the vapor line temperature, that is as vapor line temperature rises, the end point of the material condensed from these vapors increases also.

Because of the relative ease of installations and operation of temperature indicating devices, fractionation processes have for many years been controlled by temperatures. Commercial temperature indicating and control instruments serve the industry well for this purpose as evidenced by their general use.

In petroleum or crude oil fractionation, distillation ranges of gasoline and of other oils may vary a few degrees or end points may vary somewhat without detrimental effects on finally blended products.

Thermocouples operate on the principle of generation of an electromotive force as a result of a difference of temperature between two junctions of the assembly. The electromotive force generated by such elements is at best very, very small.

Bourdon tube assemblies are frequently used for indicating temperatures. These assemblies consist of a gas filled bulb connected by a small diameter tube to a pressure responsive device. Upon change of temperature of the gas filled bulb the pressure responsive device indicates a change of pressure, one to two degrees temperature change, however, produces only a small pressure change in the tube.

The small electromotive force changes from thermocouples and small pressure changes in Bourdon tube assemblies resulting from relatively small temperature changes are very difficult to utilize for control of certain industrial operation, such as distillations for separation of components having boiling points within a few degrees of each other.

In operations where one or two degrees temperature change is more or less immaterial, the above mentioned types of temperature indicators function satisfactorily. In other words temperature indicating and temperature responsive controller instruments commercially available are sensitive only to relatively large temperature changes. Thus, for controlling distillations in which temperature differences of 5° to 10° F. exist from tray to tray, the aforesaid apparatus serves very well. However, for the separation of two components having relatively close boiling points such temperature control equipment is entirely inadequate, as for example, in the separation of normal heptane from methylcyclohexane. The former boils at 209.12° F. and the latter at 213.44° F. For the separation of two such close boiling compounds a fractionator having 50 to 60 trays is ordinarily used. A 60 tray column for such service has an average temperature differential of less than 0.1° F. per tray. It is obvious therefore, that an automatic control sensitive only to 1° F. should be expected to fail to control properly such a fractionation, and such failure has been found to occur.

I have found a method for controlling fractional distillation for the separation of components having boiling points differing little from one another, as for example, normal hexane from methylcyclopentane. My method depends on controlling the fractionator according to the index of refraction of the materials being separated. I have found that when a sufficient difference in indices of refraction of the compounds being separated by fractionation occurs, my method and apparatus serve efficiently as a control for the separation.

For a separation herein mentioned in an exemplary manner, normal heptane, having an index of refraction of 1.38770 for the D line of sodium light at 20° C. and methylcyclohexane, having an index of refraction of 1.42305 for the D line of sodium light at 20° C. may be readily separated by fractional distillation when using my control methods and apparatus as herein disclosed.

One object of my invention is to provide an apparatus for and a method of fractional distillation control based on the property of index of refractionation.

Another object of my invention is to provide an apparatus and a method for the control of distillation operations for the separations of two components having relatively close normal boiling points wherein the components have dissimilar indices of refraction.

Still another object of my invention is to provide an apparatus and a method for the use of the apparatus in the control of a distillation operation using the index of refraction of the material at a process point as a basis for control.

Still another object of my invention is to devise an apparatus and to provide a method for utilizing the apparatus for liquid process control based upon difference in index of refraction of the liquids in process.

Still other objects and advantages of my invention will be apparent to those skilled in the art from a careful study of the following description and attached drawing which respectively describes and illustrates diagrammatically one form of apparatus in which the method of my invention may be practiced.

In the drawing,

Figure 1 represents diagrammatically a form of apparatus useful for practicing the method of my invention;

Figure 2 illustrates diagrammatically an alternative form of a portion of the apparatus of Figure 1; and Figure 3 is a vertical sectional view, partially in elevation, of the refractometer shown by Figures 1 and 2.

Referring to the drawing and particularly to Figure 1, a fractionating column 11 is equipped with a number of trays 12 adapted for the fractional distillation of multicomponent liquid mixtures. For my invention, the number and size and other details of the trays and even the column details are more or less immaterial. However, the separation of two hydrocarbons of relatively close boiling points usually requires a column having a large number of plates, and such a column is herein intended.

A tube 13 is attached to the column at an upper tray 12, the contents of which are to be used in the control of the operation, thus liquid from this upper tray 12 may flow downward through tube 13, through a refractometer apparatus 14 and back into the fractionating column or to such other disposal as desired through a disposal tube 16.

The refractometer apparatus 14, which will be described in some detail hereinafter, has an air inlet connection 17 and an air outlet connection 18, a water inlet connection 19 and a water outlet connection 21, and a pair of electrical connections 22. The refractometer apparatus 14 is contained within a housing or box 29 having an opening 23 through which light rays from the apparatus within the box may pass.

A lens 24 is placed a short distance from the opening 23 in the direct path of light rays emerging therefrom. The light rays upon passing through the lens 24, are crossed and fall upon two faces of a partly silvered prism 26 from which the rays are reflected as shown by the two dotted lines. These reflected rays then fall upon two photoelectric cells 27 and 28. These cells may be of the photoemissivity type since it is usually desired to make a permanent record of an operation controlled by such an instrument or apparatus as herein described, and cells of this type are adapted for use with "recording" apparatus. The two cells 27 and 28 are connected respectively by two wires 31 and 32, which latter wires are joined with one end of a wire 37, the other end of which terminates in electrical connection with the grid 38 of a phase inverter vacuum tube 39. The other terminals of these two photocells are connected by wires 33 and 34 to the minus and plus terminals of a battery 36, a central positive terminal of which is grounded by a ground connection 41.

The vacuum tube phase inverter 39 also includes an anode 52 and a cathode 42. The cathode 42 is connected by wires 43 and 47 to the grid 73 of a high vacuum tube 75 of low $\mu$. At the junction point of wires 43 and 47 is fastened one end of a resistance 44, the other end being grounded at 46. To the wire 47 is attached one end of a wire 48 and to the other end is fixed a condenser 49, which condenser is grounded at 51.

The plate 52 of the phase inverter 39 is attached by means of a wire 53 to one end of a resistance 54, the other end of which is connected by means of a wire 58 to the grid 67 of a second high vacuum tube 68 of low $\mu$. A battery 59 furnishes direct current by wires 56 and 61 to the wires 58 and 53, the latter two wires being separated by the resistance 54. The connecting wires 56 and 61 have resistances 57 and 62, disposed therein respectively. To the connecting wire 58 is also attached a condenser 64 by means of a wire 63. The condenser 64 is grounded at 66.

The vacuum tube 68 has in addition to the grid 67, a plate 71 and a cathode 69, and similarly, the tube 75 has in addition to its grid 73, also a plate 76 and a cathode 74.

The cathodes 69 and 74 of these latter tubes are interconnected by a wire 78, which from a point intermediate the cathodes is connected by a wire 79 to a source of bias voltage 81, the opposite terminal of this voltage source being grounded at 82.

The plates 71 and 76 of the tubes 68 and 75 are connected respectively by wires 72 and 77 to a controller-recorder instrument 83. When this controller-recorder instrument 83 is of the "air" type, that is, controls an operation by air pressure, a tube 84 conducts air of relatively constant pressure from a source of air, not shown, to the instrument. From the instrument the control air passes through a line 86 to a point of operational control, as a motor valve 87. As shown in the drawing this air pressure lowers the diaphragm of the motor valve 87 to open the valve 89 in a steam line 88. This latter line conducts steam from a source, not shown, to a reboiler coil 91 in the kettle section of the fractionator 11. The operation is so planned that by a predetermined change in index of refraction of hydrocarbon flowing from the fractionator through the refractometer 14 the air pressure in line 86 and accordingly the pressure on the motor valve diaphragm is so changed as to open the valve 89 to permit passage of more steam or to close the valve 89 to permit passage of less steam, as the case may be.

Tube 85 serves for venting air from tube 86 in the operation of the diaphragm 87 of the motor valve.

The embodiment of the photocell-refractometer arrangement illustrated diagrammatically in Figure 2 may be used if desired. In this embodiment the eye piece of the refractometer is removed and two condensing lens 101 and 102 inserted as shown in the paths of light rays from the varying field 103 and from the reference field 104, respectively. These two lens then transmit the light rays from said sources to focus points adjacent some photoelectric cells 106 and 107. These cells may be connected as illustrated in Figure 2 and this assembly may replace the one—lens 24—prism 26 assembly of Figure 1.

The controller-recorder broadly referred to in the drawing by reference numeral 83 may be in reality composed of two main parts, a controller mechanism 111, and a recorder mechanism 112.

The latter or recorder 112 may be of substantially any standard type of recorder available on the market, provided it be adapted to the problem at hand. Such a recorder may contain as one of its constituent parts a reversible electric motor, as illustrated by the electrical symbols 80, 80', and 90 of Figure 1. Numeral 90 specifically reprsents the armature of said reversible motor while numeral 80 refers to a left rotation field and 80' to a right rotation field. Thus when the field 80 is energized by the operation of the controllable grid high vacuum tube 68, the armature 90 rotates to the left. When a similar vacuum tube 75 operates, the field 80' is energized and the armature 90 rotates to the right. The left and right rotations of the armature are indicated and recorded on a chart by a pen arm assembly not shown. This pen arm assembly is also connected to an instrument air orifice, not shown, within the controller mechanism 111, in such a manner as to control the exit of air from the orifice. The air for pressure maintenance in control line 86 and for flowing through the orifice is furnished from a source, not shown, and enters the controller apparatus through the instrument air line 84. Air which flows through the orifice leaves the instrument through a vent line 85.

As the pen arm assembly of the recorder operates to open the air orifice in the controller, air pressure in control line 86 increases, and this pressure increase then operates to raise or to lower a diaphragm of the motor valve 87 for admission or throttling of steam to the reboiler coil 91. Conversely, when the pen arm assembly operates to close or to partly close said orifice to the flow of air, then the air pressure in line 86 decreases and the action of valve 87 is reversed.

A combination recorder-controller unit may be used in place of the two separate instruments mentioned above.

The motor valve may be operated electrically, if desired.

Another embodiment of the refractometer-photocell assembly involves the use of narrow slits in place of the condensing lens or lenses or in conjunction with such lens. These exposure slits may preferably be rather narrow, varying possibly from 1 millimeter in width, a rather wide slit, to say 0.1 millimeter in width, a narrow slit. This embodiment may be used to advantage when difficulty is experienced with color in the source of light.

Still another embodiment which may be useful under certain conditions involves the use of color filters. That is, monochromatic light or light of a relatively narrow range of wave lengths may be advantageous to use in case the white or nearly white refractometer light source is diffracted into colors in the refractometer assembly since varied colors are none too conductive to good photocell operation.

The resistances and condensers may be selected to be suitable for use with desired types or kinds of vacuum tubes and batteries, etc. The adjustment of these members is well understood by those skilled in such art.

The prism 26, the condensing lens 24, the photocells 27 and 28, and in fact the other parts of the apparatus, that is, vacuum tubes and the like may well be mounted in a dust proof box or other container as desired. Provision for water for temperature control purposes must be made for connection to and from the refractometer connections 19 and 21. Likewise, a source of low pressure, clean air, is needed to furnish air for the refractometer box 14 and a container in which the apparatus of Figure 1 may be installed, excepting possibly the controller-recorder 83, to make certain that dirt carrying corrosive gases are prevented from entering the apparatus.

In the operation of the apparatus as herein described, a material which is being fractionated in the fractionator 11 consists of components having unlike ind'ces of refraction. Refractometers may be found suitable for such an application as herein described. Such an instrument is ordinarily intended for manual use, that is liquid in process passes through the instrument as shown in Figure 1, but the observation is made manually by an operator who matches the refractometer fields by a knob adjustment and from a dial or other means reads the "index of refraction." The operator will then adjust the reboiling steam to the fractionator in accordance with the indicated needs, by manual adjustment.

By my invention I have made all of this manual operation automatic so that a continuous operation may be under continuous and fully automatic process control.

A refractometer may be made with a prism permanently fixed in place, and the prism having such an index of refraction that the instrument is adapted to the measurement of indices of refraction of a rather limited range. However, if the instrument is intended for one specific service, such a single prism apparatus may be fully satisfactory. If the instrument might be used for other service or for the control of operations involving treatment of liquids of other indices of refraction, additional prisms of other refractive powers may well be furnished. One such set of prisms furnished with a refractometer is:

| | Range of index of refraction |
|---|---|
| A Prism | 1.32539–1.36639 |
| B Prism | 1.36428–1.40608 |
| C Prism | 1.39860–1.43830 |
| D Prism | 1.43620–1.47560 |
| E Prism | 1.47320–1.51189 |
| F Prism | 1.50969–1.54409 |

Thus by such a set of prisms indices of refractions of liquids may be measured between the limits of 1.32539 and 1.54409, and the indices of refractions of most organic liquids fall between these limits.

A refractometer may well be of a continuous flow-pressure type, that is, one adapted for the continuous flow therethrough of a small volume of sample to be tested so that spot determinations may be made rapidly at any time or so that a continuous record of refractive index may be made. The instrument, or specifically all liquid containing parts should be sufficiently sturdy construction as to withstand reasonable process pressures, as for example, pressures up to say 100 pounds per square inch gage.

Built into the cabinet of the refractometer should be a constant temperature bath so that in operation the determinations may be made at a constant temperature since indices of refraction change with changes of temperature. Since water is a convenient liquid for use in constant temperature baths, or as they are frequently termed "water baths," the tubes 19 and 21 are provided for inlet and outlet, respectively, for thermostat water.

Since heat must be supplied for heating the thermostatic-bath and light must be furnished for the index measurements and electrical heat and light are quite convenient, the lead in wires 22 are provided for carrying current from an exterior source to the refractometer.

The particular or exact construction or arrangement of constituent parts within the refractometer case is more or less immaterial, since for the purpose at hand it is preferable to use a refractometer of standard design and available on the market. The refractometer must, however, be of such type as to possess two fields of light, one of which is a variable field, that is varying in intensity with the index of refraction being measured, and the other being a reference field.

The optical system of the refractometer is shown in more detail by Figure 3, in which it will be noted that a shell $a$ defines a sample chamber $b$ to which the liquid under test is admitted by an inlet $c$ and removed through an outlet $d$. The shell $a$ further defines a cooling water jacket $e$ incorporating a thermometer well $f$. A window $g$ is secured in the shell $a$ by a lock ring $h$ and a gasket $i$. Mounted within the cell $b$ is a prism $j$ carried by a packing gland $k$ incorporating a gasket $l$. Light transmitted through the prism $j$ passes through a gasket $m$ to a compensating prism $n$ and, thence, to a barrel $o$ incorporating a lens arrangement or telescope.

In operation, a beam of light is transmitted through the window $g$, and this beam is bent by refraction as it passes through the liquid in cell $b$ through an angle which is proportional to the refractive index of such liquid. The refracted beam is dispersed by the prism $j$ to produce an illuminated field or zone 103, Figure 2, where the light rays pass through an angle which is less than the critical angle of the prism together with a dark zone or field 104 which receives no light rays, since it is positioned outside the critical angle of the prism. One of the photoelectric cells 106, 107 is focused entirely upon one of these zones, preferably the illuminated zone, so as to produce a standard comparison voltage while the other photoelectric cell is focused upon a region including a part of the illuminated zone and a part of the dark zone. The voltage produced by the latter photoelectrical cell is, therefore, proportional to the relative sizes of the illuminated and dark zones which, in turn, are proportional to the index of refraction of the liquid within cell $b$. The range of operation may be readily adjusted, as to the refractive index, either by rotation of the prism $j$, adjustment of the lens in barrel $o$, or replacement of the prism with one having a different refractive index.

While I have disclosed herein the use of certain types of vacuum tubes for use in conjunction with the wiring diagram shown in Figure 1, I do not wish to limit the apparatus in this respect since other types of tubes may be used. Of course, tubes of other types should be capable of performing functions as required to operate a recorder-controller from variations in indices of refraction as determined by such a photoelectric cell refractometer combination as herein described.

In the operation of the apparatus, a liquid in process, the composition of which is desired to control the process, is passed through the sample tube 13 into the refractometer, the liquid passing out through tube 16 to such disposal as desired. From the eye pieces of the refractometer light emerges from the varying field and from the reference field, the two beams of light passing through the condensing lens 24 to opposite sides of the partly silvered prism 26. The prism surfaces reflect these light beams to the photocells 27 and 28, the intensity of the beams controlling the amount of current permitted to flow through the cells from the battery 36. This difference in current flow makes the grid 38 of tube 39 either positive or negative depending upon whether photocell 28 or photocell 27 respectively receives the brighter light rays. When the grid of tube 39 becomes negative the grid 67 of tube 68 becomes positive permitting the flow of a larger current through wire 72 to energize the field coil 80, which operation permits the armature 90 of the reversible motor to rotate in one direction. Conversely, when the grid of tube 39 becomes positive the grid 73 of tube 75 becomes positive permitting the flow of a larger current through wire 77 to energize the field coil 80', which operation permits the armature 90 of said reversible motor to rotate in the reverse direction. The degree of positive or negative charge on grid 38 of tube 39 controls the intensity of the respective charges on the grids 67 and 73 and the degree of the positive or negative charge on the grids 67 and 73 controls the intensity of current flowing through the wires 72 and 77 and the field coils 80 and 80', thus the speed of the reversible motor armature 90 is controlled by the difference in the light intensities striking the two photocells 27 and 28.

This variable armature speed may then be recorded on a chart in terms of index of refraction, the apparatus of course, having been previously calibrated. Then according to the chart recordings, the controller mechanism functions to permit increase or decrease of air pressure in line 86 to open or to close the valve 89 to the flow of steam for reboiling purposes.

Such an apparatus may be used for the control of reflux to a fractionator tower, or may be used for controlling one component in a two component blending operation. The principle finds many applications in the petroleum refining industry, for example, in the blending of two component liquids to make a blend of predetermined index of refraction, or in pipeline pumping of petroleum products. And in a similar manner my method of process control may find application in many chemical industries in which two or more liquids to be separated or processed have sufficiently different indices of refraction as to be detected by such photoelectric cells as the emissivity cells contemplated for use herein.

In the separation of each of the pairs of compounds listed hereinafter an 80 to 100 plate fractionating column may be required. The difference in boiling points between methylcyclohexane and n-heptane is 4.32° F. When using a 100 plate column, the average temperature difference between successive plates is 0.0432° F. Temperature control apparatus based on thermocouple type of indicating apparatus are sensitive at best to about 1° F., which would mean a variation of 1° F. would throw operation off about 23 plates, which operation of course could not be tolerated. Considering the most sensitive thermometer controlling devices available at the present time, the sensitivity is 0.0006 of the scale offered and 150° F. is the smallest scale range offered. This sensitivity is equivalent to 1.77 theoretical trays, or in other words this means that a maximum operational lag of 1.77 trays occurs between "off" and "on" periods of operation. This slippage of 1.77 theoretical trays could cause the desired product to be off specification as much as 0.4 mol per cent.

In contrast to this relatively large slippage the refractometer as herein described is sensitive to the extent of 1/375 theoretical tray, based on 100% separation using 100 theoretical plates. Thus it is seen that the refractometer gives exceedingly accurate and sensitive control.

*Specific example*

|  | B. P., °F. | Index of Refr. D Line of Sodium Light at 20° C. |
| --- | --- | --- |
| N-Heptane | 209.12 | 1.38770 |
| Methylcyclohexane | 213.44 | 1.42305 |
| N-Hexane | 155.75 | 1.37494 |
| Methylcyclopentane | 161.33 | 1.40978 |

N-hexane may be taken overhead as product, and the operation controlled as herein disclosed, provided that the column has a sufficiently large number of trays to affect such a separation. However, in an exemplary manner, I will hereinbelow describe an operation for taking overhead a blend of predetermined composition.

A feed stock containing 56.7% n-heptane and 43.3% methylcyclohexane is fed to a 100 tray bubble plate column to produce an overhead product of 94.3% n-heptane and 5.7% methylcyclohexane. This mixture possesses a boiling point of 209.365° F. and an index of refraction of 1.38970. The kettle product for this separation consists of 4.4% normal heptane and 95.6% methylcyclohexane with a boiling point of 213.17° F. and a refractive index of 1.42150. To control the overhead product to the hereinabove mentioned specification it is desirable that sample tube 13 be connected to the fractionator tower 11 at such a point as to sample the contents of the 14th tray from the top of the column. On the other hand, to control the kettle product to the above given specification I take sample from the 16th tray up from the kettle. In either of these cases the sample disposal tube 16 may be connected to a lower tray in the column or to some other disposal as desired.

In gas processing systems my invention may be used, providing sufficient differential in indices of refraction of gases in process occur. When passing fluids through the refractometer, the fluid should be either all liquid or all gas but not both. This distinction is necessary since normally liquids are much more dense than gases and accordingly have much greater indices of refraction.

While the refractometer apparatus itself may be assembled in a case or cabinet, it may be well to install the entire apparatus of the invention in a case, excepting possibly the controller-recorder 33. However, this controller-recorder may be included in such a case if a door be provided for removing or inserting circular or roll chart paper in the recorder. Such a case should be glass at this point for observation purposes.

This invention may be adapted to the separation of one liquid from a mixture of two or more liquids, the one liquid being an overhead distillation product, or a kettle bottoms product or even a side stream intermediate boiling material. The materials being separated need not necessarily have closely adjacent boiling points, but may have widely different boiling points. However, my invention has special utility in separating certain materials of close boiling points under which conditions ordinary temperature responsive methods of control fail.

The method and apparatus may be used in the separation and isolation of individual compounds or in the separation and isolation of mixtures of materials, as illustrated in the hereinbefore discussed specific example. The method may be further used in controlling the addition of a solid soluble material to a liquid for the preparation of a solution of definite composition, provided the presence of the solute alters sufficiently the index of refraction of the resulting solution.

It will be obvious to those skilled in such art that many modifications and variations in the apparatus and many applications of the method may be made and yet remain within the intended spirit and scope of my invention.

Having disclosed my invention, I claim:

1. A method for controlling the continuous fractional distillation of a plurality of close boiling liquids having substantially different indices of refraction for the separation of the lowest boiling of said liquids which comprises the steps of continuously withdrawing a quantity of liquid from a predetermined region of a fractionating tower in which the distillation of said liquids is carried out, passing a beam of light through the withdrawn liquid to cause bending of the beam by refraction, which bending is proportional to the index of refraction of said withdrawn liquid, focusing the refracted beam to produce an illuminated zone and a dark zone, producing an electrical voltage representative of the light intensity in one of said zones, producing an electrical voltage representative of the light intensity in a region including a portion of each zone, said last-mentioned voltage varying in accordance with the index of refraction of the withdrawn liquid, electrically comparing said voltages to produce a resultant voltage, and controlling the heat supplied to the fractionating tower in response to the magnitude of said resultant voltage.

2. A method for controlling the continuous fractional distillation of a plurality of close boiling liquids having substantially different indices of refraction for the separation of the lowest boiling of said liquids which comprises the steps of continuously withdrawing a quantity of liquid from a predetermined region of a fractionating tower in which the distillation of said liquids is carried out, passing a beam of light through the withdrawn liquid to cause bending of the beam by refraction, which bending is proportional to the index of refraction of said withdrawn liquid, focusing the refracted beam to produce an illuminated zone and a dark zone, whereby the boundary between said zones varies in accordance with the index of refraction of said withdrawn liquid, converting radiation from said illuminated zone into an electrical voltage representative thereof, converting radiation from a region including a portion of each zone into an electrical voltage representative thereof, electrically comparing said voltages to produce a resultant voltage, and controlling the heat supplied to the fractionating tower responsive to the magnitude of said resultant voltage.

3. A method in accordance with claim 2 in which the close boiling liquids are, respectively, normal heptane and methylcyclohexane.

JOHN W. LATCHUM, JR.

REFERENCES CITED

The following references are of record in the file of this patent:

UNITED STATES PATENTS

| Number | Name | Date |
|---|---|---|
| 1,471,342 | Logan | Oct. 23, 1923 |
| 1,863,346 | Moore et al. | June 14, 1932 |
| 1,905,251 | Styer | Apr. 25, 1933 |
| 1,987,311 | Poole | Jan. 8, 1935 |
| 2,086,808 | Kallam | July 13, 1937 |
| 2,090,915 | Powell et al. | Aug. 24, 1937 |
| 2,118,842 | Grebe | May 31, 1938 |
| 2,180,512 | Fenske | Nov. 21, 1939 |
| 2,217,637 | Jenkins | Oct. 8, 1940 |
| 2,251,771 | Winin | Aug. 5, 1941 |
| 2,306,073 | Metcalf | Dec. 22, 1942 |
| 2,386,601 | Fisher | Oct. 9, 1945 |
| 2,386,830 | Wright | Oct. 16, 1945 |
| 2,386,831 | Wright | Oct. 16, 1945 |
| 2,414,371 | Fragen et al. | Jan. 14, 1947 |
| 2,421,854 | Seaman | June 10, 1947 |

OTHER REFERENCES

Brun et al., Journal of Research of the National Bureau of Standards, Research paper 239, vol. 5, 1930, 1 figure, pages 933 to 967.

Rose et al., Journal of Research of the National Bureau of Standards, Research paper 1123, vol. 21, Aug. 1938, pp. 167–184.

Mair et al., Journal of Research of the National Bureau of Standards, Research paper 1, vol. 27, July 1941, pp. 44–63.

Livingston Physico Chemical Experiments, Macmillan Co. 1939, Experiment 21, pages 142–149. (Copy in Library of Congress.)